United States Patent
Janik et al.

(10) Patent No.: US 6,187,188 B1
(45) Date of Patent: Feb. 13, 2001

(54) FILTER CARTRIDGE RETENTION SYSTEM

(75) Inventors: Leon P. Janik, Suffield; Michael J. Williams, Glastonbury, both of CT (US)

(73) Assignee: Stanadyne Automotive Corp., Windsor, CT (US)

( * ) Notice: Under 35 U.S.C. 154(b), the term of this patent shall be extended for 0 days.

(21) Appl. No.: 09/356,578

(22) Filed: Jul. 19, 1999

(51) Int. Cl.[7] .................................................. B01D 35/30
(52) U.S. Cl. ...................... 210/232; 210/438; 210/440; 210/444; 210/DIG. 17
(58) Field of Search ................................. 210/232, 438, 210/440, 443, 444, DIG. 17

(56) References Cited

U.S. PATENT DOCUMENTS

| | | | |
|---|---|---|---|
| 2,568,196 | * 9/1951 | Kennedy | 210/DIG. 17 |
| 4,857,189 | * 8/1989 | Thomsen et al. | 210/440 |
| 5,035,797 | * 7/1991 | Janik | 210/232 |
| 5,186,829 | * 2/1993 | Janik | 210/232 |
| 5,203,994 | * 4/1993 | Janik | 210/232 |

FOREIGN PATENT DOCUMENTS

2037661 * 12/1970 (FR) .................................... 210/440

* cited by examiner

Primary Examiner—Matthew O. Savage
(74) Attorney, Agent, or Firm—Alix, Yale & Ristas, LLP

(57) ABSTRACT

A fuel filter cartridge has a plurality of retention tabs which radially integrally project along the roll seam structure which joins a top section of the housing to the cylindrical lower section. A base contains complementary slots which allow for the cartridge to be axially inserted and rotated to secure the replaceable cartridge in position. Various numbers and configurations of the retention tabs may be provided.

20 Claims, 5 Drawing Sheets

FILTER CARTRIDGE RETENTION SYSTEM

BACKGROUND OF THE INVENTION

This invention relates generally to fuel filters employed in connection with internal combustion engines. More particularly, the present invention relates to replaceable fuel filter cartridges for removing foreign particles and/or separating water from the fuel supply system of an internal combustion engine.

Fuel filter systems to which the invention relates commonly employ a disposable filter cartridge which is replaced at pre-established intervals of filter usage. The replaceable cartridge is conventionally secured to a base which forms inlet and outlet connections between the cartridge and the fuel supply system. Numerous retention systems have been employed for securing the filter cartridge to the base and allowing removal of the cartridge for replacement purposes.

In U.S. Pat. No. 5,017,285, which is assigned to the assignee of the present invention, a disclosed fuel filter assembly comprises a base which mounts to the vehicle and a disposable filter cartridge which is suspended from the filter base. In this configuration, the cartridge is retained to the base by a threaded collar. The collar has a rim which retentatively engages against a protruding roll seam structure at the periphery of the cartridge housing. The cartridge is thus replaced by loosening the threaded collar and dismounting the filter cartridge.

In U.S. Pat. No. 5,203,994, which is assigned to the assignee of the present invention, the disposable filter cartridge is mounted to the base by a retainer collar. The base and the retainer collar have a pair of complementary spiral ramp-like structures. The retainer collar rotatably follows the ramp-like structures so that catches are positioned in slots of the base for locking the cartridge to the base. A spring biases the catch to the locked position. The spring is a spring washer which has an inscribed starlike configuration wherein one alternating set of spring leaves engages against the end of the cartridge and the second set is engageable against an adjacent surface of the base.

In U.S. Pat. No. 5,302,284, which is assigned to the assignee of the present invention, a disposable filter cartridge is retained to the base by means of a spring-loaded collar. The collar carries a wave spring and has followers which ascend a spiral ramp of the base to secure the disposable cartridge in a positive locked position.

SUMMARY OF THE INVENTION

Briefly stated, the invention in a preferred form is a filter cartridge wherein the cartridge housing comprises a pair of sections which are joined along a peripheral roll seam. Portions of the housing and roll seam are radially offset to form integral retention tabs. In one embodiment, the housing is substantially symmetric about the central axis, and the retention tabs are equiangularly spaced about the axis. The tabs subtend a substantially equiangular arcuate extension. The equiangularly spaced retention tabs are preferably congruent and have substantially equal radii of curvature coaxial with the central axis. The roll seam may comprise alternating radial inner and outer arcuate segments. The inner segments have substantially equal radii of curvature, and the outer segments have substantially equal radii of curvature.

The base is preferably configured so that axial slots complementary with the retention tabs axially receive the retention tabs so that the cartridge may be secured to the base upon axial insertion and angularly rotating the cartridge. In one preferred embodiment, there are three equiangularly spaced retention tabs and three equiangularly spaced slots.

The housing may also comprise at least one arcuate slot having a profile coaxial with the central axis to receive an axial key of the base. In addition, the filter cartridge may also have a cylindrical side wall which comprises at least one arcuate protrusion which radially extends from the side wall. Thus the retention tabs may be incorporated into multiple levels of keying for identification and quality control purposes.

An object of the invention is to provide a new and improved retention system for securing a disposable cartridge to the base of a fuel filter and for efficiently releasing to allow removal of the cartridge for replacement purposes.

Another object of the invention is to provide a new and improved retention system for a fuel filter cartridge which has an efficient and low cost construction.

A further object of the invention is to provide a new and improved disposable filter cartridge having a retention structure to facilitate retaining the cartridge and releasing the cartridge in an efficient and reliable manner.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompany drawings in which.

DETAILED DESCRIPTION OF THE PREFERRED EMBODIMENTS

Figure 1:
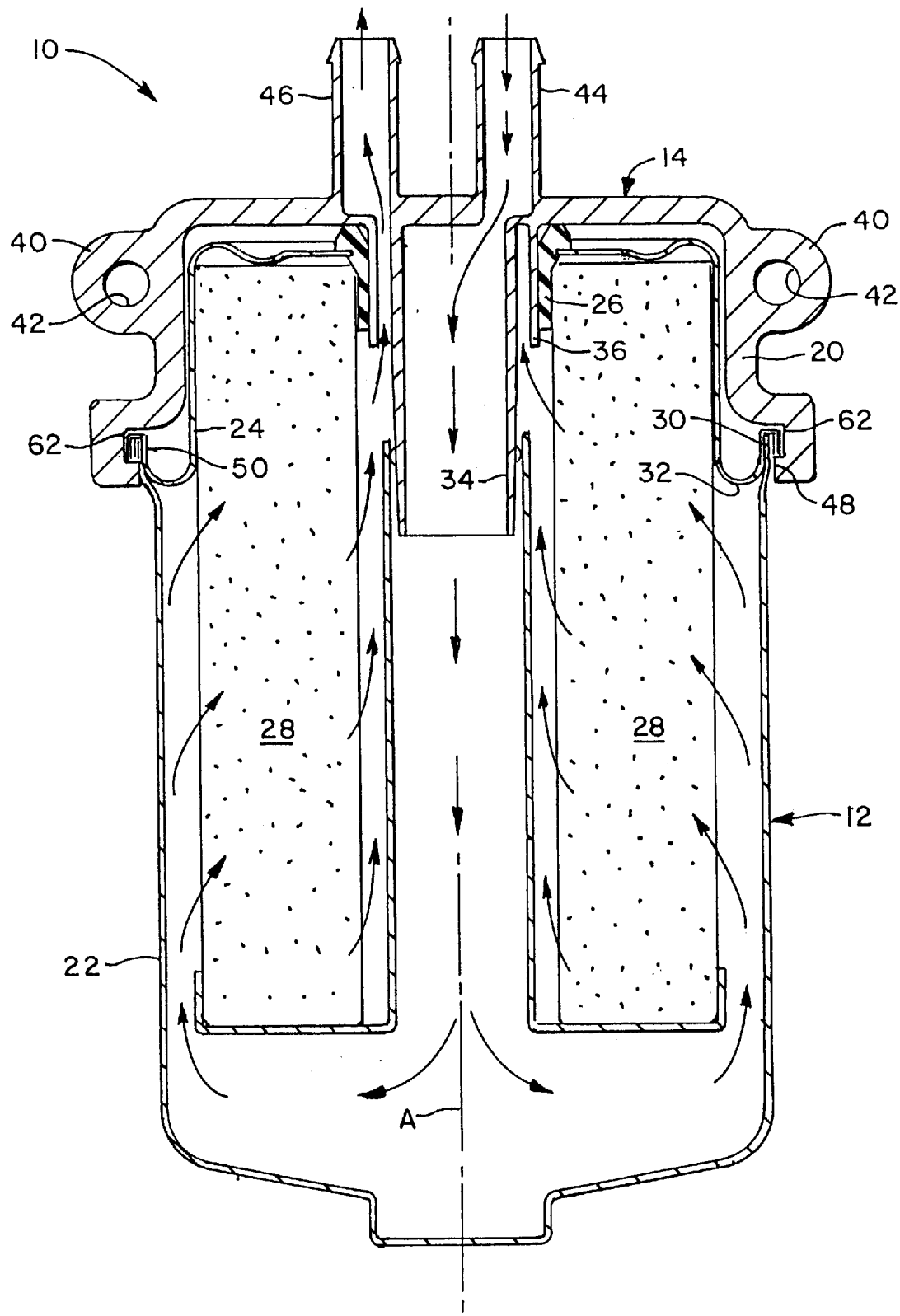
FIG. 1 is a central elevational sectional view, partly in diagrammatic form, of a fuel filter assembly comprising a base and a fuel filter cartridge incorporating a retention system of the present invention.

With reference to the drawings, wherein like numerals represent like parts throughout the several figures, a fuel filter assembly in accordance with the present invention is generally designated by the numeral 10. Fuel filter assembly 10 comprises a disposable filter cartridge 12 which mounts to a base 14 or header. The cartridge incorporates a retention system which locks the cartridge to the base during usage and permits replacement of the cartridge as required. Although numerous applications are possible, the fuel filter assembly is especially adapted for incorporation into the fuel supply system of an internal combustion engine (not illustrated), such as a diesel engine, for removing particulate matter from the fuel and/or for separating water from the fuel. For the illustrated embodiment, the disposable filter cartridge is suspended from the base although the retention system also has ready applicability to other mounting orientations. The invention is also applicable for other filter applications.

The disposable filter cartridge 12 comprises a can-like container which in the illustrated embodiment comprises a pair of lower and upper shell sections 22 and 24 which are joined along a circumferential roll seam 30. The upper section may include a U-shaped compound bend 32 adjacent the roll seam 30. The upper section 24 is smaller in diameter than the lower section 22. The sections 22, 24, except for certain peripheral features as described below, are generally symmetrical about central axis A. A sealing grommet 26 is mounted in a central axial opening through the upper end wall section 24. The sealing grommet 26 in typical fashion inwardly seals against an outer fluid conduit of the base to provide fuel communication therewith.

The interior configuration of the cartridge 12 may include one or more continuous fan-shaped pleated filter elements 28 with various internal structures for directing the fuel flow through the element or elements. None of the interior structures are specifically part of the invention. Water may collect in a sump at the bottom of the cartridge and be removed through a draincock (not illustrated). The interior structure of the cartridge may, for example, be similar in form and function to that described in U.S. Pat. Nos. 5,302,284, 5,614,091 and 5,766,463.

Figure 2:
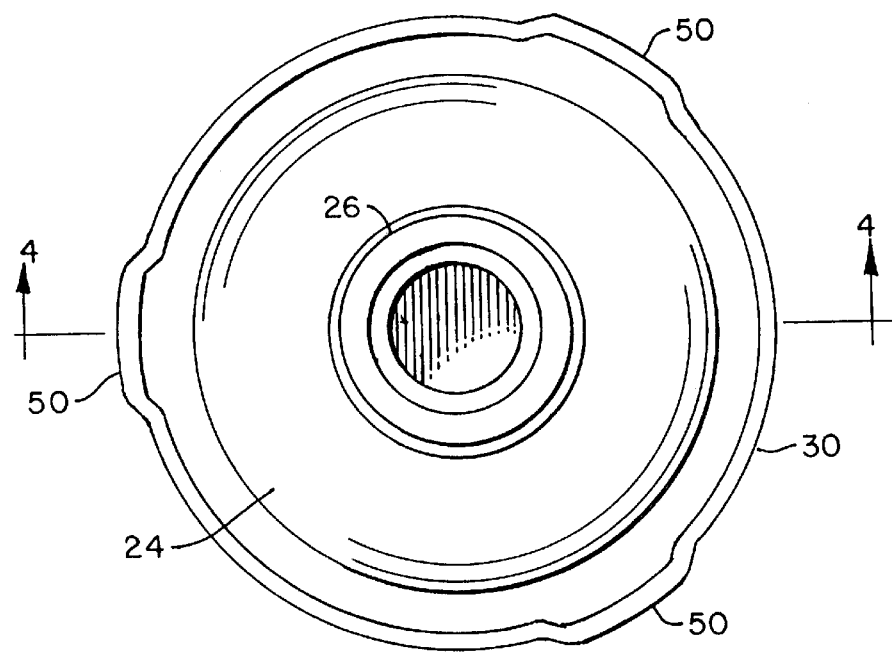
FIG. 2 is a top plan view of the filter cartridge of FIG. 1.
Figure 3:
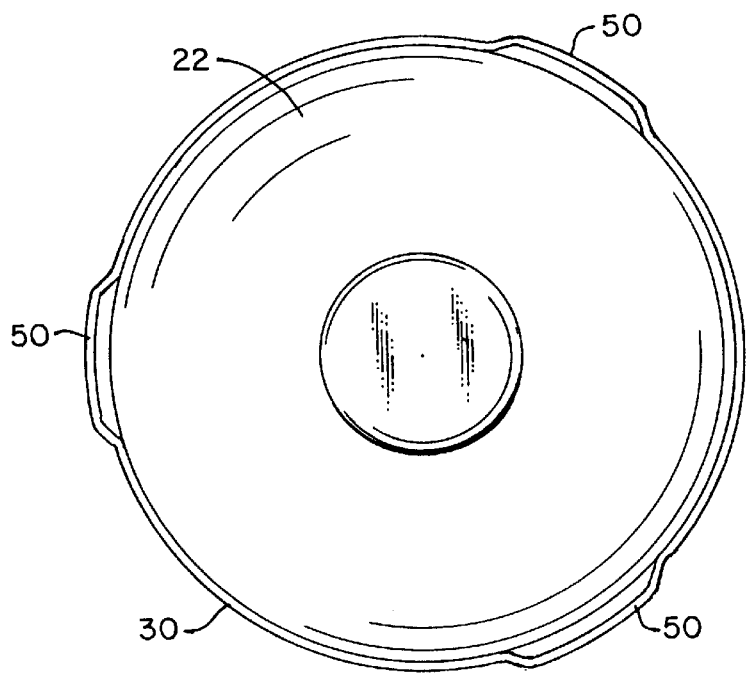
FIG. 3 is a bottom plan view of the filter cartridge of FIG. 1.
Figure 4:
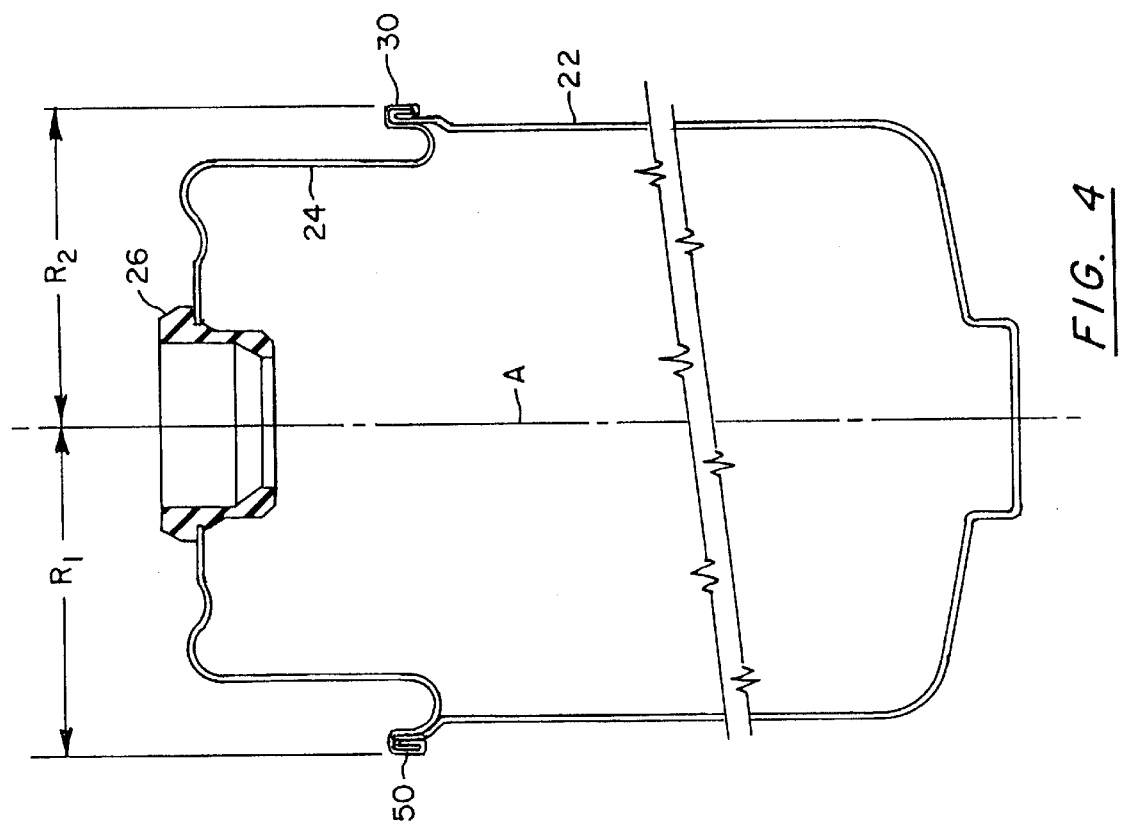
FIG. 4 is a sectional view, partly broken away and partly in diagrammatic form and with portions removed, of the filter cartridge of FIG. 1.

The roll seam 30 and adjacent structure of the filter cartridge sections 22, 24 are radially offset relative to axis A to form one or more arcuate retention tabs 50. As best illustrated in FIG. 4, each tab 50 integrally projects radially from the cartridge relative to axis A and has a radius of curvature $R_1$ which is greater than the radius of curvature $R_2$ of the non-offset portion of the roll seam. In one preferred embodiment, as illustrated in FIGS. 2 and 3, three equiangularly spaced retention tabs 50 are formed. The retention tabs are equiangularly spaced, subtend a substantially equal arcuate angle and are substantially congruent. The roll seam thus comprises alternating radially inner and outer arcuate segments. It is preferred that the tabs be formed by pressing or forming portions of the cartridge radially outwardly although the protruding tabs may also be formed by pressing the adjacent cartridge portions radially inwardly.

Figure 7:
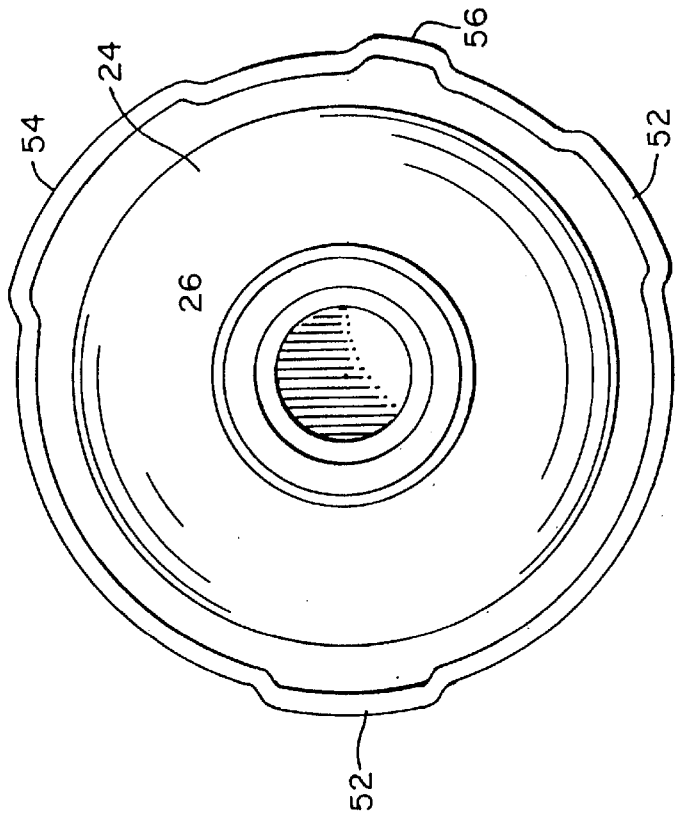
FIG. 7 is a top plan view of a second alternate embodiment of the filter cartridge of FIG. 1.
Figure 6:
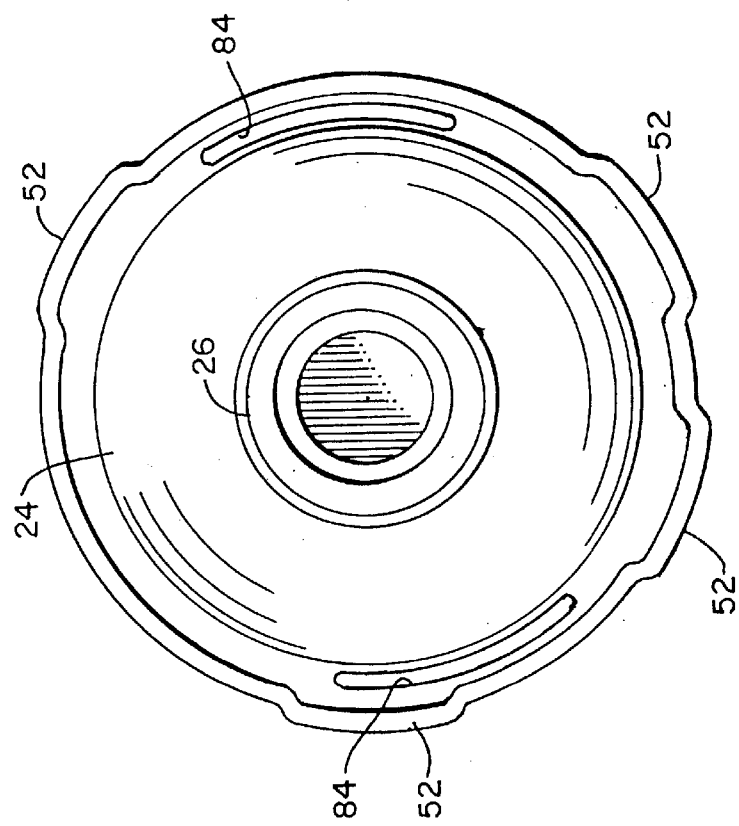
FIG. 6 is a top plan view of an alternate embodiment of the filter cartridge of FIG. 1.

The specific number and angular orientation of the tabs may vary for a given application. The application may be defined by the type or capacity or other quality of the cartridge. As illustrated in FIG. 6, there may be four (or multiple) tabs 52. In addition, the tabs need not be equiangularly spaced about the central axis A. As illustrated in FIG. 7, the tabs 52, 54 and 56 may subtend different arcuate angles or distances.

The base 14 preferably comprises an inverted cylindrical receptacle 20 as illustrated in FIG. 1. The receptacle forms a skirt defining a lower receiving cavity for the upper portions of the disposable cartridge 12. The base includes an elongated sleevelike conduit 34 and an outer concentric sleevelike conduit 36 which seal with the cartridge 12. An axial inlet connector 44 at the upper side location of the base connects with the fuel line to provide fluid communication through the passageway defined by the first conduit 34. An outlet connector 46 in an upper side location of the base connects with the fuel line to provide external communication from the axial fluid conduit defined between the first and second conduits 34 and 36. The conduits and connectors thus function to generally provide coaxial fluid communication between the base and the disposable cartridge. The preferred flow path through the cartridge and base is illustrated by the FIG. 1 arrows.

An integral projecting bracket 40 projects transversely of the base and includes a pair of openings 42 which receive fasteners (not illustrated) for anchoring the filter base to the engine header or other vehicle structure (neither illustrated). The base can be configured in a wide variety of configurations, including a wide variety of bracket structures and mounting configurations.

Figure 5:
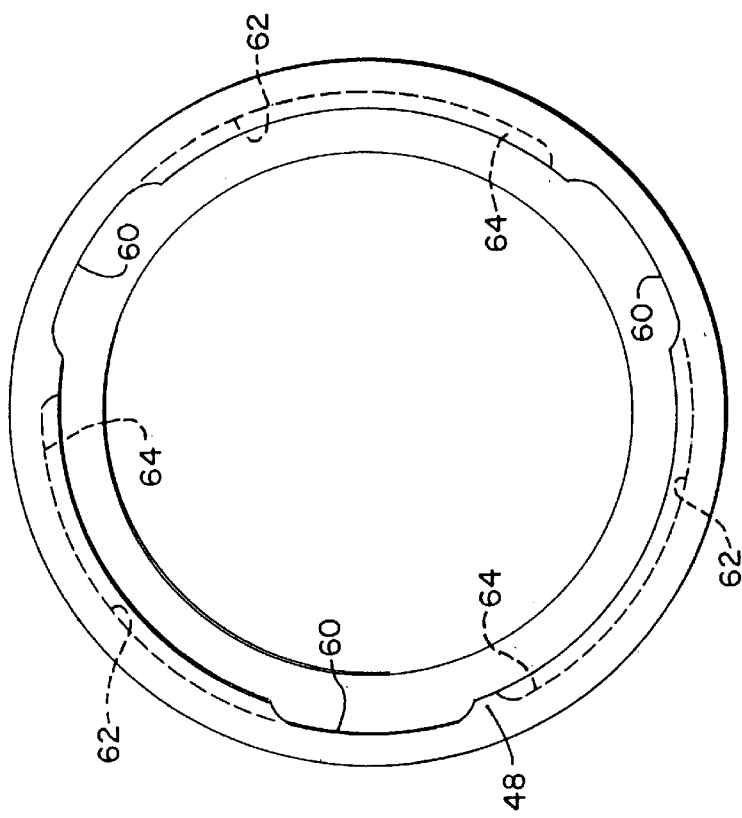
FIG. 5 is a bottom plan view, partly in phantom, of the lower end of the base of FIG. 4.

With reference to FIGS. 1 and 5, the lower portion of the base has a flared structure with an inwardly extending lip 48 which defines an inward circumferential retention channel 62. The lip defines inward axial slots 60 which are complementary with and are positioned so that the retention tabs 50, upon alignment and axial insertion, may be closely received therein as best illustrated in FIGS. 2 and 5. Naturally, a corresponding different slot configuration would be required for the embodiments of FIGS. 6 and 7.

The filter cartridge may thus be retained to the base by axially aligning the tabs 50 with the slots 60 and upwardly displacing the cartridge 12 into the receiving receptacle of the base. The cartridge is then angularly rotated so that the tabs partially defined by the roll seam shoulder angularly traverse the channel and ride a retention shoulder defined by the lip 48 to a corresponding seat 64 shown in phantom in FIG. 5. The shoulder may also have a ramplike configuration to force the cartridge into a tight engagement against the upper or lower shoulder of the base and to retain the tabs in their seats against counter-rotation and release from the base.

In one embodiment, a spring is disposed between the upper interior end of the base and for biasing against the upper end of the cartridge to provide a spring-loaded retention locking of the cartridge to the base. The spring may assume a wide variety of configurations, and in one embodiment, as illustrated in FIG. 1, the spring or bias function may be provided by the resilient end portion of the sealing grommet 28.

Figure 8:
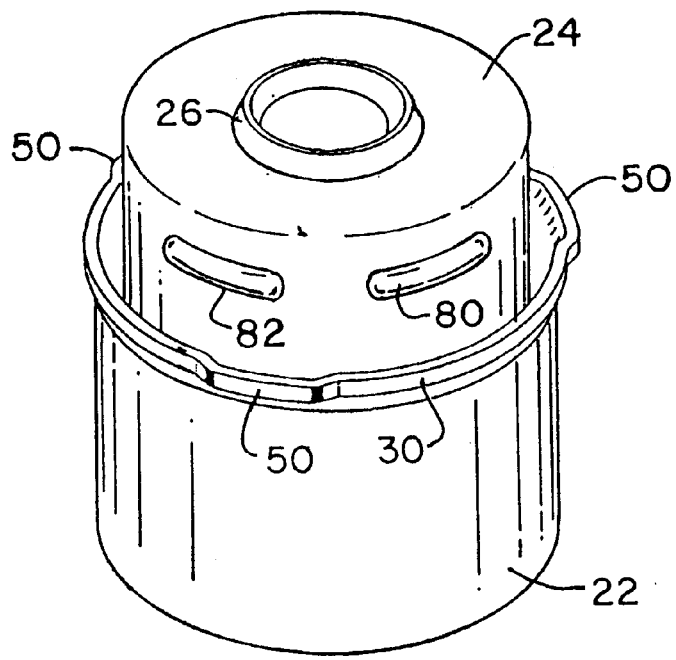
FIG. 8 is a perspective view of a third alternate embodiment of the filter cartridge of FIG. 1.
Figure 9:
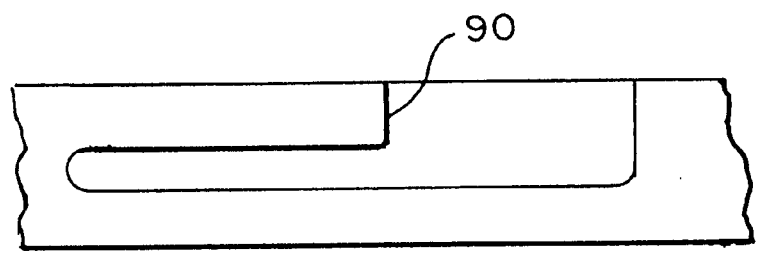
FIG. 9 is a fragmentary interior view of a base for the filter cartridge of FIG. 8.

With reference to FIG. 8, the cartridge may also employ angularly spaced arcuate protrusions 80, 82 which protrude radially from the cylindrical side wall of section 24 of the cartridge as disclosed in U.S. Pat. Nos. 5,186,829 and 5,766,463. For such an embodiment, the base has a corresponding track which engages the protrusions and keys the cartridge with the base. With reference to FIG. 9, the base may thus form an L-shaped track 90 to provide a secondary keying type system.

The cartridge may also employ, apart from or in conjunction with, a key protrusion such as protrusion 80, a second axial key/arcuate slot system for selectively keying the base with the cartridge as disclosed in U.S. Pat. Nos. 5,186,829 and 5,766,463, the disclosure of which is hereby incorporated by reference. In this configuration, one or more arcuate slots 84 (FIGS. 6 and 8) in an insert or the intermediate end of the cartridge wall would accept an axial key or keys (not illustrated) of the base and permit limited rotation of the cartridge to secure same in position. Alternatively, arcuate keys having a profile similar to slots 84 may axially protrude from the cartridge.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter cartridge comprising:

a filter;

a housing for said filter, said housing comprising first and second sections and a central axis;

said first section defining an axial opening and joined to said second section along a peripheral roll-type seam; and at least one portion of said housing and roll-type seam being outwardly radially offset relative to said central axis and remaining portion of the housing and roll seam to form a retention tab.

2. The filter cartridge of claim 1, further comprising a plurality of portions of said housing outwardly radially offset relative to said central axis to form angularly spaced retention tabs.

3. The filter cartridge of claim 2, wherein said housing is substantially symmetric about said central axis and said retention tabs are equiangularly spaced about said axis.

4. The filter cartridge of claim 3, wherein each of said tabs subtend a substantially equiangular arcuate extension of said housing and roll-type seam, wherein said arcuate extension extends radially outward relative to said central axis.

5. The filter cartridge of claim 1, wherein there are three substantially congruent retention tabs, said retention tabs being equiangularly spaced about said central axis.

6. The filter cartridge of claim 1, wherein said roll-type seam comprises a n interior surface facing generally toward said central axis, an exterior surface facing away from said central axis and generally parallel to said interior surface, said roll-type seam including alternating radially inner and radially outer arcuate segments relative to said central axis, said interior and exterior surfaces being generally equidistantly spaced from each other.

7. The filter cartridge of claim 6, wherein said radially inner segments have substantially equal first radii of curvature and said radially outer segments have substantially equal second radii of curvature, said second radii being greater than said first radii with respect to said central axis.

8. The filter cartridge of claim 1 wherein said housing first section includes a radially outward compound bend which forms an annular recess and an insert disposed in said annular recess defines at least one arcuate slot having a profile coaxial with said central axis.

9. The filter cartridge of claim 1, wherein said first housing section has a cylindrical side wall surrounding said central axis and further comprises at least one arcuate protrusion radially protruding relative to said central axis from said side wall.

10. A filter assembly comprising:

a cartridge having an axis and comprising a filter, a housing for said filter comprising a first section defining an axial opening and a second section connected to said first section along a peripheral roll seam, at least one retention tab partially defined by an arcuate extension of said roll seam and said housing, said retention tab projecting radially outwardly relative to said axis and remaining portions of the housing and roll seam; and a base comprising:

a receptacle defining a receiving cavity for receiving an end portion of said cartridge; and an extension extending from said receptacle and having an inwardly disposed retention lip having a retention shoulder, said lip defining at least one axial slot which is complementary with said at least one retention tab and angularly alignable therewith, so that said cartridge is axially mountable into said receptacle and rotatable, wherein said at least one retention tab engages the retention shoulder of said base for securement therewith.

11. The filter assembly of claim 10, wherein there are three equiangularly spaced retention tabs and three equiangularly spaced slots.

12. The filter assembly of claim 10, further comprising biasing means for biasing said end of said cartridge away from said base so that said at least one retention tab is biased into retentive engagement with said retention shoulder of said base.

13. The filter assembly of claim 10, wherein said base defines an L-shaped track and said first section has a generally cylindrical side wall with at least one protrusion radially extending from said side wall and engageable in said track, each said protrusion axially spaced from said retention tab and extending radially outwardly relative to said central axis.

14. The filter assembly of claim 10, wherein there are a plurality of congruent retention tabs.

15. The filter assembly of claim 10, wherein said roll seam comprises alternating radially inner and outer arcuate segments relative to said central axis.

16. A filter cartridge comprising:

a filter;

a housing for said filter, said housing comprising a central axis and defining an axial opening;

a circumferential peripheral shoulder extending radially from said housing relative to said central axis; and multiple angularly spaced portions of said housing and shoulder being radially outwardly offset relative to said central axis and remaining portions of the housing and shoulder to form multiple retention tabs having arcuate profiles coaxial with said central axis.

17. The filter cartridge of claim 16, wherein said housing is substantially symmetric about said central axis and said retention tabs are equiangularly spaced about said axis.

18. The filter cartridge of claim 16, wherein there are three substantially congruent equiangularly spaced retention tabs.

19. The filter cartridge of claim 16, wherein said peripheral shoulder comprises alternating radially inner and outer arcuate segments coaxial with said central axis.

20. The filter cartridge of claim 19, wherein said inner segments have substantially equal radii of curvature relative to said central axis and said outer segments have substantially equal radii of curvature relative to said central axis.

* * * * *